United States Patent
Gehlot (10) Patent No.: US 7,190,897 B2
(45) Date of Patent: Mar. 13, 2007

(54) OPTICAL CHANNEL OPERATING PARAMETERS MONITORING

(75) Inventor: Narayan L. Gehlot, Sayreville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 896 days.

(21) Appl. No.: 09/897,848

(22) Filed: Jul. 2, 2001

(65) Prior Publication Data

US 2003/0002111 A1 Jan. 2, 2003

(51) Int. Cl.
*H04B 10/08* (2006.01)
(52) U.S. Cl. .............................. 398/30; 398/32; 398/76
(58) Field of Classification Search ................ 398/30, 398/32, 76, 149, 159, 182–201
See application file for complete search history.

(56) References Cited

U.S. PATENT DOCUMENTS

| 4,675,880 | A | * | 6/1987 | Davarian | 375/261 |
| 5,483,233 | A | * | 1/1996 | Pettitt et al. | 340/870.26 |
| 5,956,165 | A | * | 9/1999 | Fee et al. | 398/78 |
| 6,046,841 | A | * | 4/2000 | Mahgerefteh et al. | 359/326 |
| 6,108,113 | A | * | 8/2000 | Fee | 398/16 |
| 6,570,689 | B1 | * | 5/2003 | Kushita | 398/132 |
| 6,592,273 | B1 | * | 7/2003 | Habel et al. | 398/140 |
| 2002/0181052 | A1 | * | 12/2002 | Butman et al. | 359/154 |

* cited by examiner

Primary Examiner—Dzung Tran (57) ABSTRACT

In a communication system, channel operating parameter carrier frequencies are located in the vicinity of data nulls in a data spectrum. The operating parameter carriers are summed with the data signal. At the receiver, the operating parameter carrier frequencies are recovered by demodulation techniques, and the operating parameters are recovered and processed.

12 Claims, 9 Drawing Sheets

OPTICAL CHANNEL OPERATING PARAMETERS MONITORING

CROSS-REFERENCE TO RELATED APPLICATIONS

This application is related to U.S. patent application Ser. No. 09/197,223, entitled "System and Method for Generating NRZ Signals From RZ Signals in Communications Networks," which is incorporated herein by reference.

FIELD OF THE INVENTION

The invention relates generally to communications systems and more particularly to operating channel parameter acquisition and processing in communications systems.

BACKGROUND

Channel Operating Parameters (COP) provide information regarding performance in a communications system. Known methods for operating parameter acquisition are inadequate for modern optical systems due to their expense, high service costs, and inability to provide output in the presence of communication data within acceptable time constraints. In one method applicable to wavelength division multiplexed systems (WDM), a separate monitoring wavelength is provided for the operating parameter data. No other data is transmitted on this wavelength. This method was developed for systems having relatively small bandwidth, for example, systems carrying between 8 and 10 optical channels. As the number of optical channels increases, however, a single wavelength cannot carry sufficient operating parameter information.

In large WDM systems, numerous wavelengths (optical channels) carry data. The wavelengths are typically spread over different frequency bands, and more than one monitoring channel must be provided to monitor each of the frequency bands. The increased number of monitoring channels wastes valuable bandwidth. In addition, introducing multiple monitoring channels upsets signal channel power, and channel spacing becomes critical to minimize four-wave mixing introduced by the monitoring channels.

In another method, operating parameters are acquired and monitored using a carrier frequency modulated by pseudo code. The carrier signal is input to the communications system by multiplying the COP carrier with the data signal, and is recovered at the COP receiver using correlation techniques. The method is typically implemented with loop-back error detection schemes, where the loop-back signals are suppressed (for example, 30 dB) from the data signal. When no data is being transferred on the communication system, this method can deliver error detection measurements in a relatively short time. When data is present, however, the signal to noise ratio is poor and the time for making measurements increases. It is known for measurements to take over eight (8) hours to complete in a single WDM channel. In an N channel system, the loopback steps through each channel sequentially. To test the whole system can require as much as N×8 hours. Such long measurements provide unreliable results.

Furthermore, as the channels in a system increase, the hardware required for the loop-back test also increases. In an N channel optical system, for example, N bays of equipment are required to implement the loop-back according to the method set forth above. The hardware cost in a typical optical system makes this method of measurement undesirable. Also, as the number of channels increases, using the loop-back method increases the likelihood of cross talk, further decreasing the reliability of the test.

SUMMARY

Operating parameter acquisition according to the principles of the invention provides for real-time, parallel monitoring of any number of the system channels, and, in optical systems, compensates for non-linearities introduced by the fiber on the optical monitoring channel itself. One or more channel operating parameter carrier frequencies are located in the vicinity of data nulls in the data signal spectrum (electrical domain). The electrical domain signal spectrum is the electrical signal power as mapped to the electrical signal frequency. The operating parameter carrier frequencies are summed with the data signal. At the receiver, the operating parameter carrier frequencies are recovered, such as by bandwidth filtering at the data null frequencies, and the operating parameter data is recovered and processed.

In an exemplary optical system transmitting NRZ format data, the operating parameter data is carried on a pair of optical channel operating parameter (OCOP) carrier frequencies. The carriers can have frequency values located in successive nulls in the NRZ spectrum, respectively, or in the same null separated by more than twice the OCOP data bandwidth. The OCOP carriers are sinusoidal to eliminate phase noise due to unwanted harmonics introduced by square wave carriers, and are modulated by OCOP NRZ data. The carriers are bandwith limited prior to transmission, and are combined with digital line data using optical couplers or summed in the electrical domain prior to laser modulation. The OCOP receiver recovers the OCOP data and converts it to an electrical signal using PIN diodes. A bandwith filter located at the vicinity of the data nulls recovers the data.

BRIEF DESCRIPTION OF THE DRAWINGS

An understanding of the principles of the invention can be had with reference to the following drawings, in which.

DETAILED DESCRIPTION

This detailed description sets forth a system and method for channel operating parameter (COP) acquisition in a communications system. Channel operating parameters provide information about the operation of a channel in a network, such as whether the communications link is continuous, and whether hardware and software is operating correctly. The COP may also provide quality of service information regarding the channel being measured. In COP acquisition according to the principles of the invention, one or more COP carriers having frequencies in the vicinity of nulls in the frequency spectrum of the data signal are generated. The data signal is summed with the COP carriers and the resulting signal is transmitted. At the receiver, the data and the COP information are separated and processed.

Figure 1:
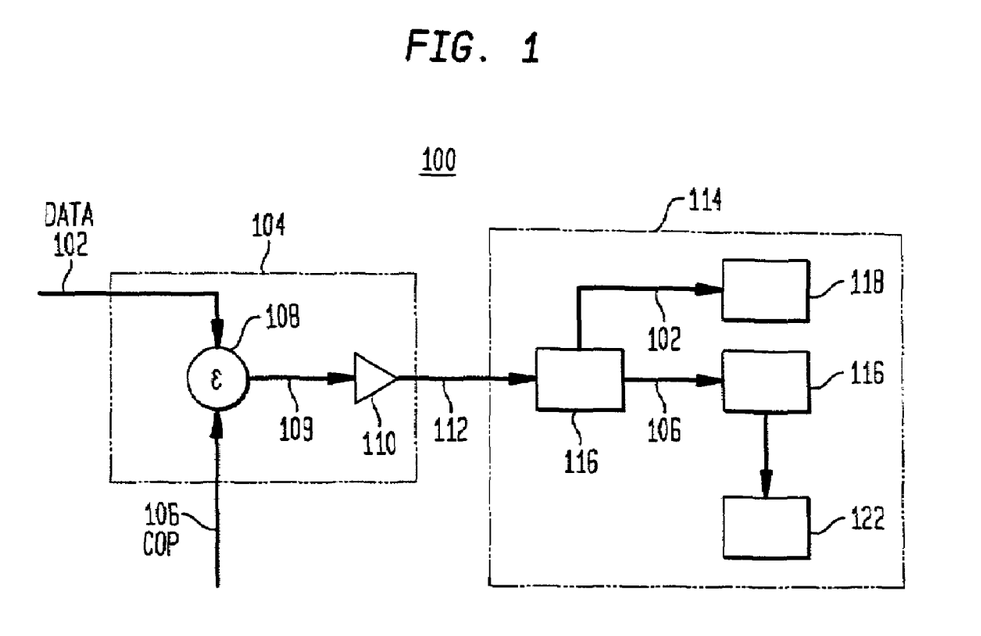
FIG. 1 illustrates an exemplary communications system according to the principles of the invention.

A block diagram of an exemplary communications system 100 according to the principles of the invention is shown in FIG. 1. The system includes a transmitter 104, a communications channel 112 and a receiver 114. The transmitter includes a summer 108 and an amplifier 110. In the transmitter 104, the summer 108 adds the data signal 102 and the COP carrier 106. The COP carrier 106 is generated at a frequency in the vicinity of a null in the spectrum of the data signal 102. The summed signal 109 is amplified in the amplifier 110, and transmitted via the communications channel 112. The receiver 114 includes a demodulator 116 for demodulating the transmitted signal. The demodulator 116 recovers the COP carrier 106. An A to D converter 116 implements the autocorrelation function on the COP data stream in the hardware domain. The autocorrelation function recovers and restores the COP data bits for processing by a digital processor 122. The data signal 102 is processed in a data receiver 118.

Figure 2:
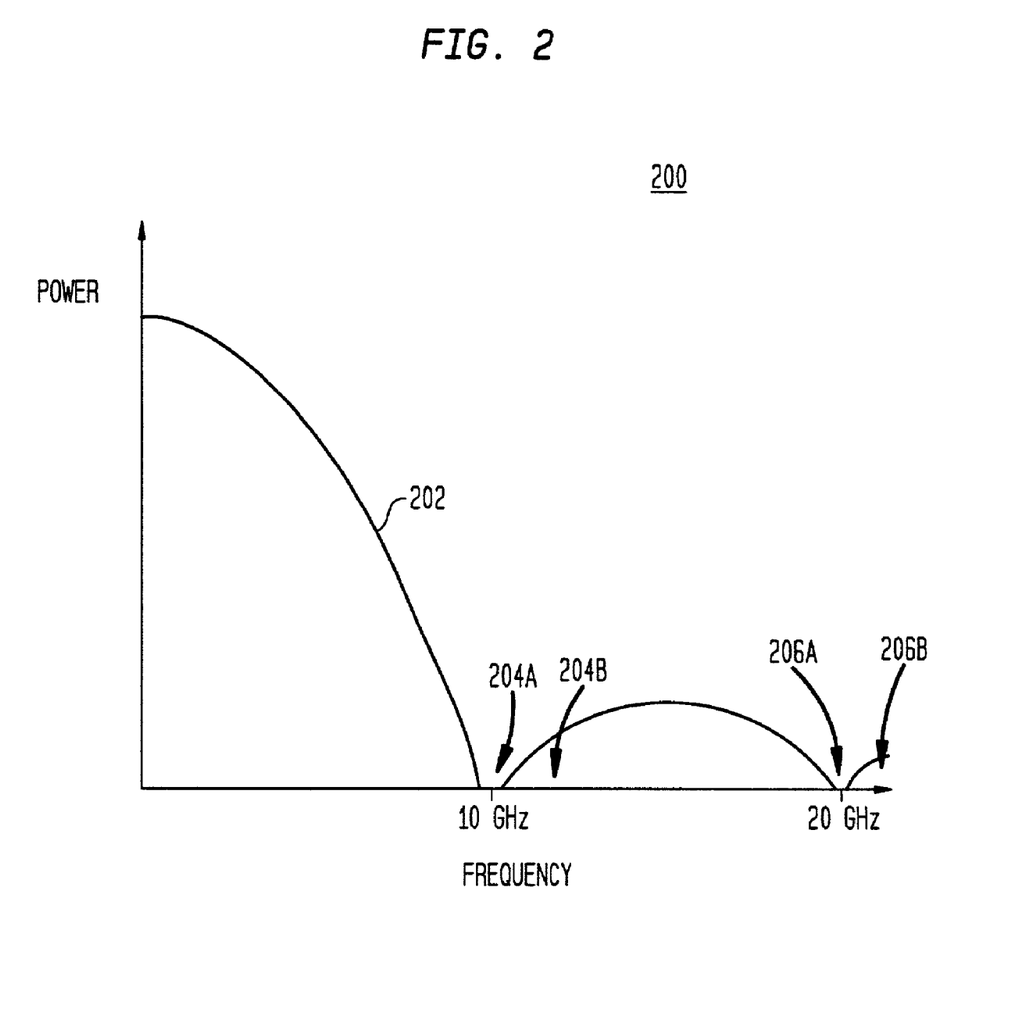
FIG. 2 shows an exemplary location of carriers in a data spectrum.

FIG. 2 illustrates a data signal frequency spectrum 200 in the electrical domain. The curve 202 plots the power spectrum for data transmission having a line data rate of 10 Gb/sec. Nulls 204A and 206A occur at approximately 10 GHz and 20 GHz. In an exemplary system according to the principles of the invention, the COP carrier signals have a frequency value in the vicinity of the nulls 204A and 206A. For example, in the system 100 of FIG. 1, the transmitter 104 generates a COP carrier having a frequency of approximately 10 GHz or 20 GHz. If more than one COP carrier is used, the carriers can have frequencies in the successive nulls 204A and 206A (located at 10 GHz and 20 GHz respectively).

Alternatively, multiple COP carriers can be located in the vicinity of a single null, if the carriers are sufficiently separated. Twice the OCOP data bandwidth is the theoretic minimum frequency separation. This approach can be used when the successive nulls are separated in frequency by a value that does not permit acceptable recovery at the receiver. In FIG. 2, two COP carriers can be located in the vicinity of 10 GHz, as indicated by arrows 204A and 204B, or 20 GHz, as indicated by arrows 206A and 206B. It should be apparent that the illustrated spectrum plot 202 is exemplary, and that other spectrums could indicate transmitting COP carriers in different nulls.

In one exemplary embodiment, the system 100 of FIG. 1 can be configured as an optical system. In an optical system, the channel operating parameters are referred to as optical channel operating parameters (OCOP) and the carriers are OCOP carriers. The OCOP carrier frequencies have values in the vicinities of nulls in the spectrum, where minimal signal power due to spectrum frequencies from the line data is expected. The first null occurs at 1/Tb (where Tb is the bit period) for the digital line data rate (i.e. line clock rate/ signaling rate) of Tb. For example, if the line data rate is 5 Gb/s, the first null occurs at 1/5 Gb/s, which equals 200 picoseconds Tb. The OCOP data rate can be restricted (Rg. to 2 Mbits/sec) to minimize interference between the modulated carrier and the digital line data spectrum.

The OCOP carriers are modulated by OCOP NRZ data. Binary Phase Shift Keying is one suitable modulation technique. To limit the OCOP NRZ bandwidth, the modulated OCOP carrier can be passed through a filter such as a Bessel filter for low-phase distortion. OCOP Data can be recovered from the Radio Frequency carriers (the OCOP carriers) using known detection techniques. The OCOP carriers can be sinusoids to reduce unwanted intermodulation products. The harmonics of a square wave carrier introduce phase noise at the OCOP receiver due to phase changes introduced by the fiberoptic channel, optical amplifiers and filters. At the receiver, the OCOP carriers are recovered by, for example, bandwidth filtering at the frequency of the data nulls.

Figure 3A:
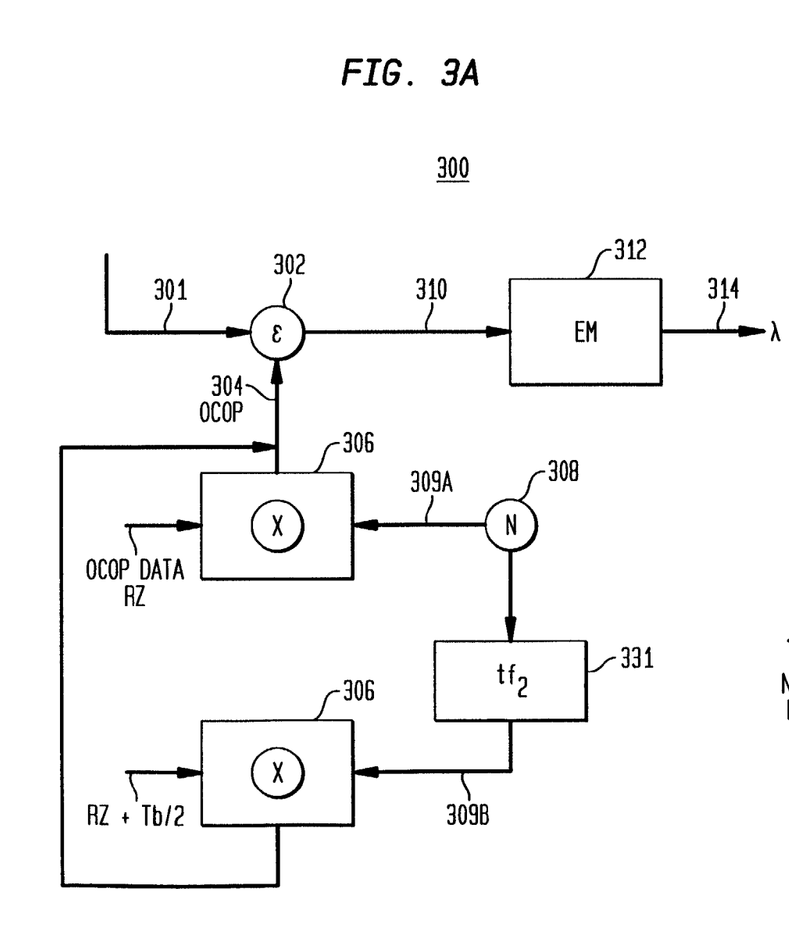
FIGS. 3A and 3B illustrate exemplary transmitters according to the principles of the invention.

FIG. 3A shows a functional diagram for an exemplary OCOP transmitter 300 according to the principles of the invention. In this transmitter 300, the data signal 301 is summed in a summer 302 with the OCOP carriers 304 in the electrical domain. An OCOP oscillator 308 generates the OCOP carrier 309A. The carrier has a frequency value in the vicinity of a null in the electrical spectrum of the data signal 301, as previously explained. Process block 331 provides a carrier frequency 309B in a successive null. NRZ coded OCOP data is generated from RZ data and RZ+Tb/2 data in the multipliers 306. An NRZ coded signal for a given data stream is equivalent to the sum of two RZ coded signals for that data stream. The summer 302 provides the summed OCOP and data signals 310, which is used to modulate an optical signal in the external modulator 312. The modulator 312 provides an optical channel, 314.

The use of two RZ encoded data signals to generate an NRZ encoded signal is explained in U.S. patent application Ser. No. 09/197,223, entitled "System and Method for Generating NRZ Signals From RZ Signals in Communications Networks." A "1" in a bit of the data as represented in RZ has a pulse width T/2, which is half that of the data as represented in NRZ code. Each coded RZ bit can be delayed by T/2 to derive a replication of that RZ coding with a delay of ½ the clock interval. The RZ signal is than summed with the delayed RZ signal to derive a data coding of NRZ at the receiver, which is the equivalent of NRZ of the original data. This can be implemented in a communication system by transmitting RZ coded data and its delayed counterpart so that a RZ coded signal can be used at the receiver to generate a NRZ signal with suitable compensation for non-linearities introduced by the fiber. Compensation can be introduced by manipulating the RZ bits (eg. sliding the bits relative to each other) in the transmitter or receiver.

The resulting pair of OCOP signals form a bit sequence. To maximize the information transmitted and to boost noise immunity, the NRZ data can be transmitted as a psuedo random bit sequence (PRBS) packet and zeroes. Correlation at the receiver is used to recover the bit sequence and unique coding is used to define the data packets. Differential encoding can be used to insure low power at DC and to eliminate error propagation. The number of bits in a packet is governed by the minimum separation between repeaters and the pair of OCOP data line/clock rate. For example, where the OCOP clock rate is 2 Mb/second and the minimum distance between optical repeaters is equal to or more than 13 Km, the OCOP packet may be optimized to a 128 bit length.

Figure 3B:
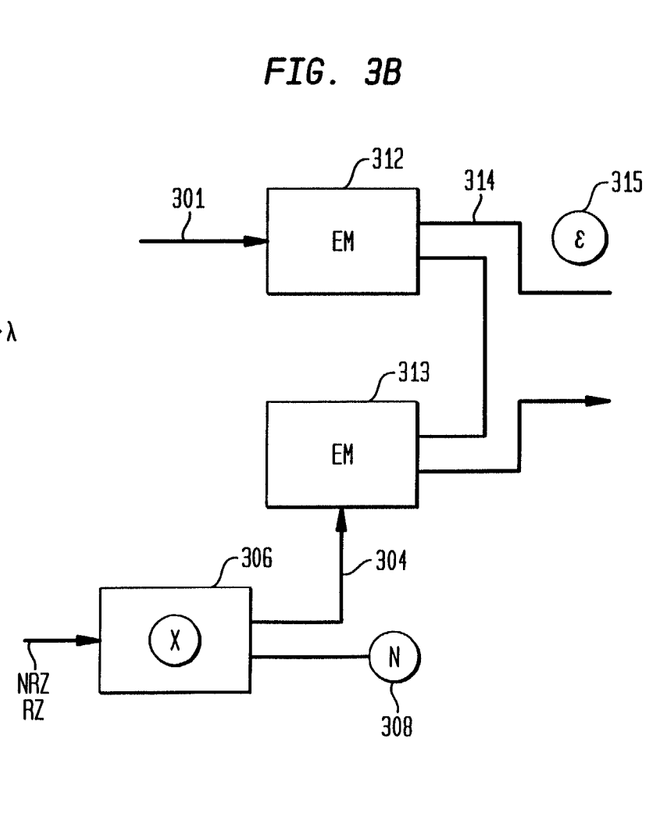

In FIG. 3B, summation of the OCOP signal 304 and the data signal 301 occurs in the optical domain. The oscillator 308 generates the OCOP carriers, which are modulated by the OCOP data in the multiplier 306. An external modulator 313 provides an optical OCOP signal. The data signal 301 also modulates an optical carrier in an external modulator 312. An optical coupler 315 sums the modulated optical OCOP carriers and the modulated optical data carrier. Like in the communications system of FIG. 3A, the OCOP carriers can be used to transmit RZ data and RZ+1/2Tb, which can be recovered as NRZ data in the receiver.

Figure 4:
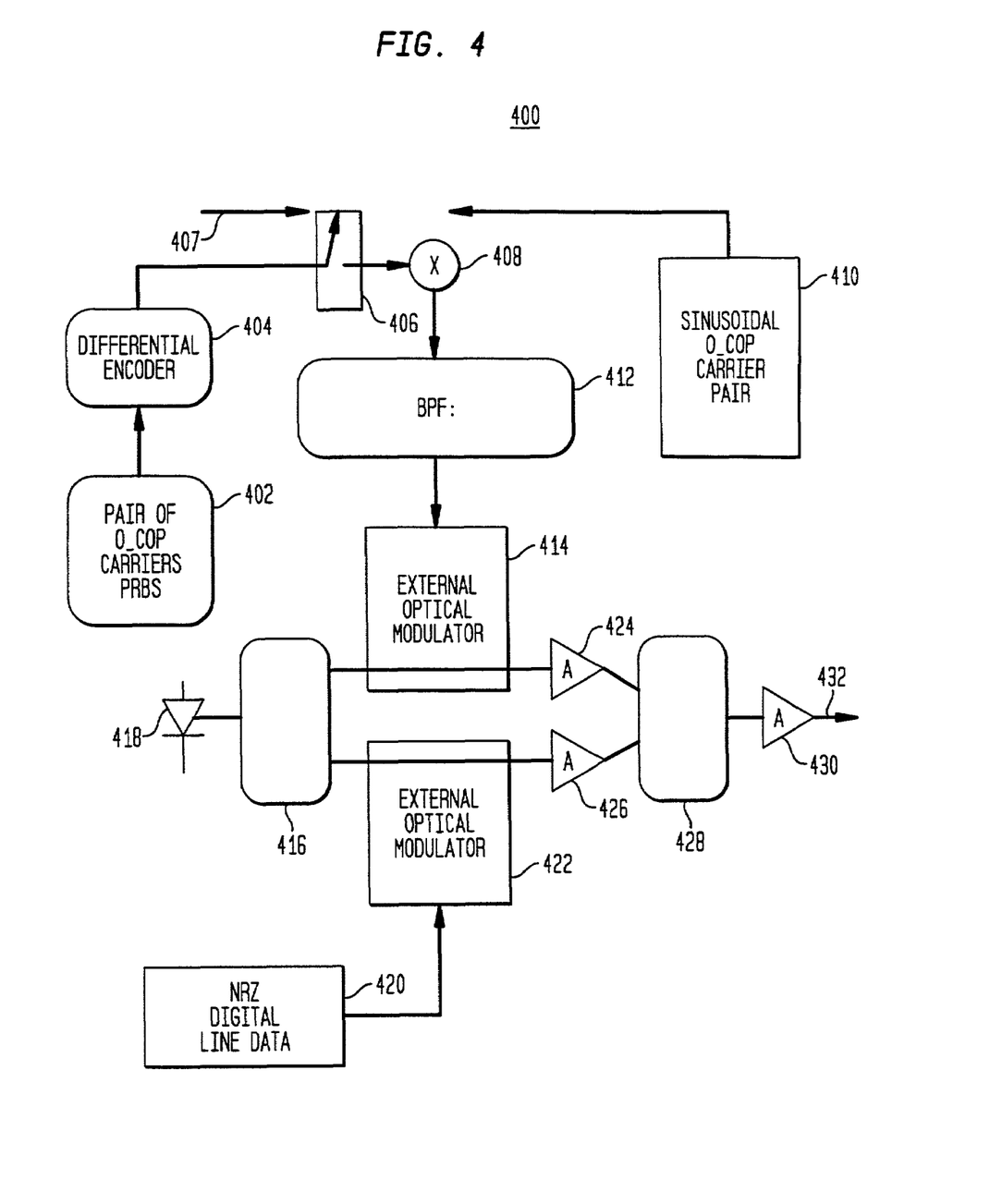
FIG. 4 illustrates another exemplary transmitter according to the principles of the invention.

FIG. 4 shows a functional block diagram 400 for another exemplary transmitter according to the principles of the invention. This transmitter 400 is for use in an optical system implementing a wavelength division multiplexing (WDM) transmission format. In an oscillator 410 an OCOP carrier pair is generated. The carriers are sinusoidal and separated in frequency such that one carrier carries RZ data, and the other carries a replica of the RZ data delayed by ½ of the clock interval, for example ½(2 MB/s data). The frequencies of the carriers are in the vicinity of data nulls for the data spectrum. In the pseudo random bit sequence generator 402, a PRBS of 2 Mb/s (128 bits/packet) is generated and processed by a differential encoder 404. The outputs of the encoder 404 and the OCOP carriers are multiplied by the multiplier 408.

An optical coupler 416 splits the output from a laser diode 418. A bandpass filter 412 bandlimits the output of the multiplier 408 and provides the bandlimited OCOP signals to an optical modulator 414. The information signal, for example NRZ digital line data, modulates the optical carrier in the optical modulator 422. The outputs of the modulators 414 and 422 are amplified in amplifiers 424 and 426. Another optical coupler 428 forms an optical summation of the signals, which is amplified in amplifier 430 prior to transmission over the optical channel 432. A noise switch 407 selectively connects and disconnects the encoder output to the multiplier 408. When the switch 407 is open, no measurement is taken and the output at the receiver is the system noise.

Figure 5:
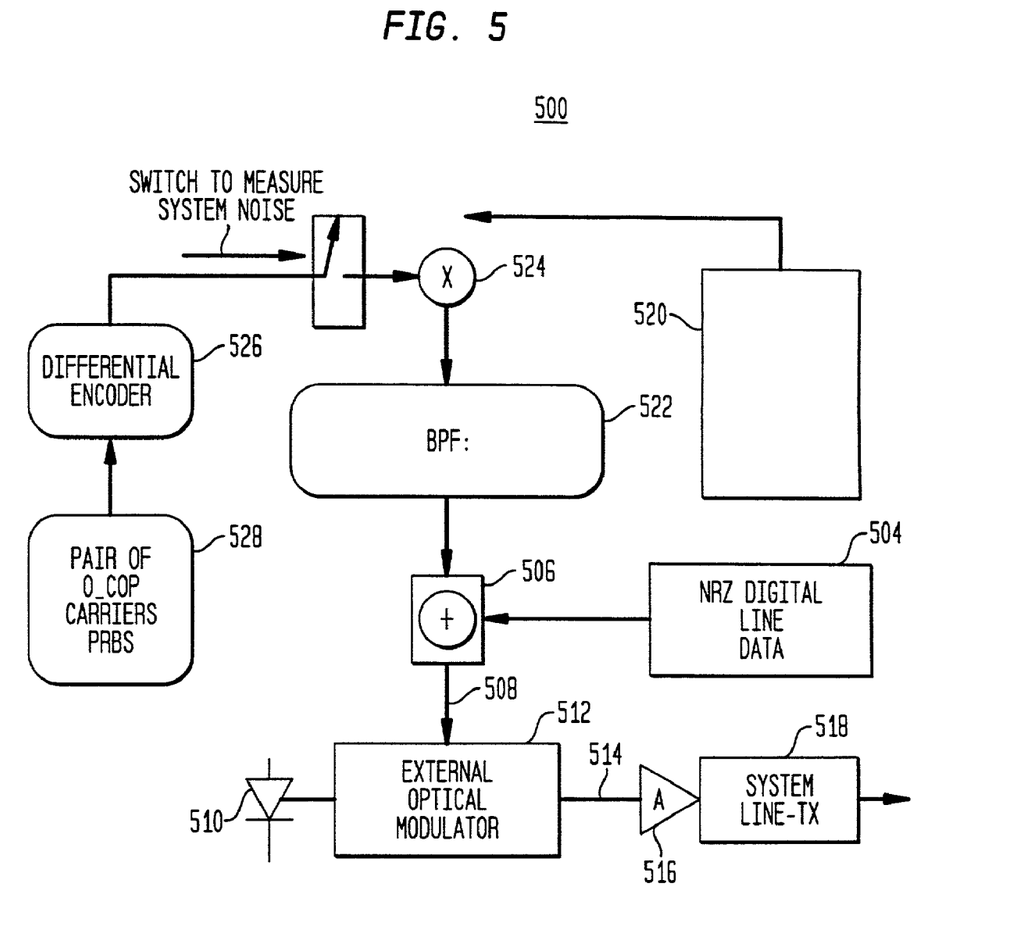
FIG. 5 illustrates another exemplary transmitter according to the principles of the invention.

In another transmitter 500 embodiment, shown in FIG. 5, the digital line data 502 is electrically summed with the OCOP signal 506. The summed signal 508 modulates the optical signal provided by the laser diode 510 in an optical modulator 512. The modulated signal 514 is amplified in an amplifier 516 for transmission over the system channel 518. The operation of the OCOP carrier generator 520, multiplier 524, PRBS generator 528 and encoder 526 are the same as for the transmitter 400 of FIG. 4.

Figure 6:
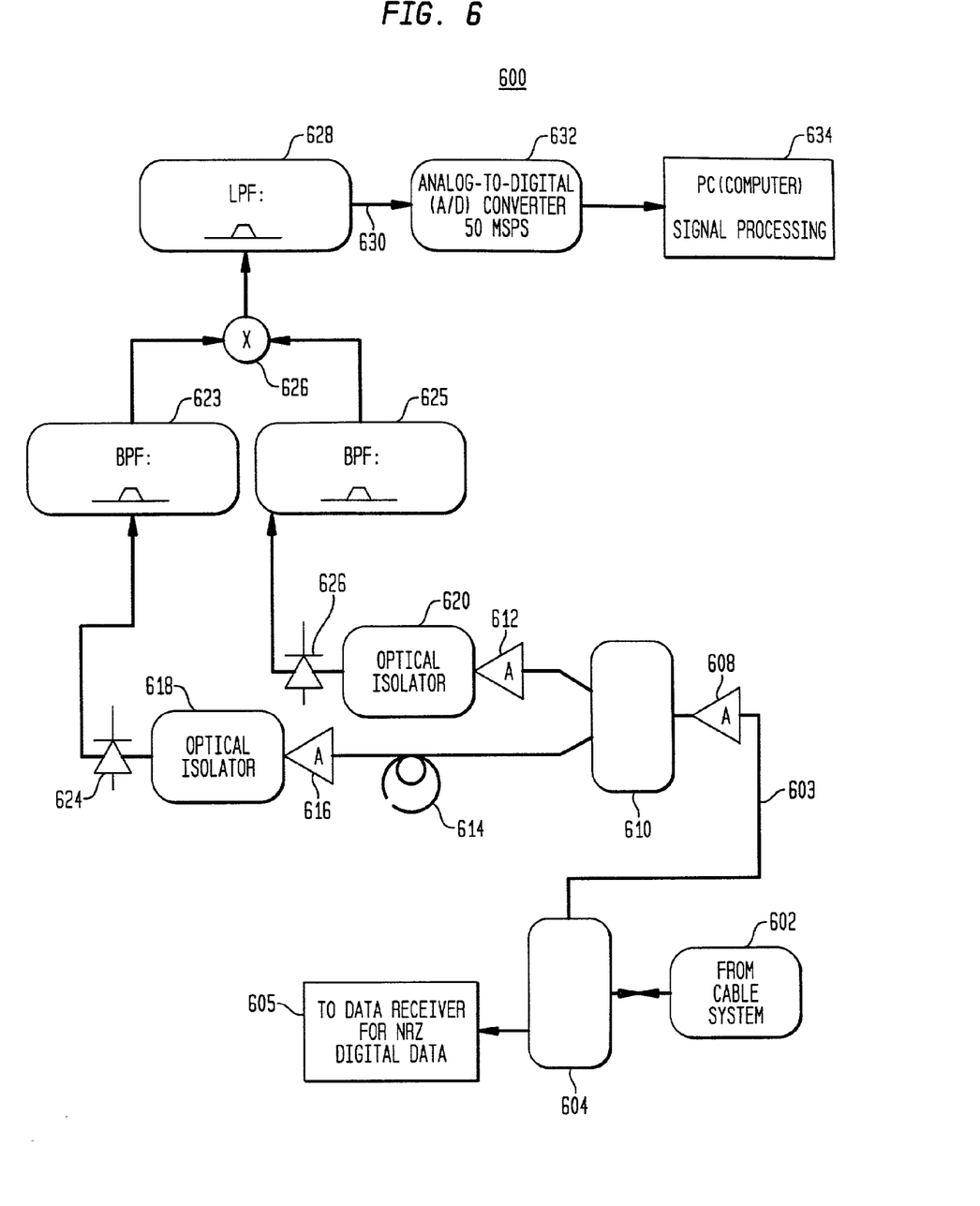
FIG. 6 illustrates an exemplary receiver according to the principles of the invention.

At the receiver, the OCOP signal is manipulated to receive NRZ bits against transmitted RZ bits. The receiver detects the RZ bits and restores them to NRZ for information retrieval. An exemplary receiver 600 is shown in FIG. 6. The incoming signal 602 includes the information signal and the OCOP signal. The information signal, which is NRZ digital data in this example, is routed to the data receiver 605 via an optical coupler 604. The OCOP signal is routed by the coupler 604 to an amplifier 608. The amplified signal is split in an optical coupler 610. Half of the signal is processed by an amplifier 612 and an optical isolator 620, and the other half is delayed in the optical delay element 614. The optical delay is determined by the OCOP data rate. The delay elements permit manipulation of the RZ data bits to compensate for the nonlinearities, as previously described. In this example, the OCOP data rate is 2 Mb/s and a delay of $0.5 \times 10^{-6}$ seconds is desired to recover NRZ bits. For an optical delay of $5 \times 10^{-6}$ s/meter, 100 meters of optical fiber will impose sufficient delay. Delay can also be generated in the electrical domain or with other passive optical components.

The two halves of the optical power are amplified by amplifiers 612 and 616 and isolated in optical isolators 618 and 620, respectively. Optical to electrical converters (PIN diodes, for example) 624 and 626 respectively convert the optical signals to electrical signals, where they are bandpass limited in filters 623 and 625. A multiplier 626 multiplies the two signals and a low pass filter 628 processes the multiplied signal. The output 630 of the low pass filter 628 is a bit stream carrying the OCOP data 630. The analog data signal is processed by an A/D converter 632 so that signal processing can be implemented in a signal-processing unit 634. The A/D converter implements autocorrelation and reduces or eliminates clock regeneration requirements.

Figure 7:
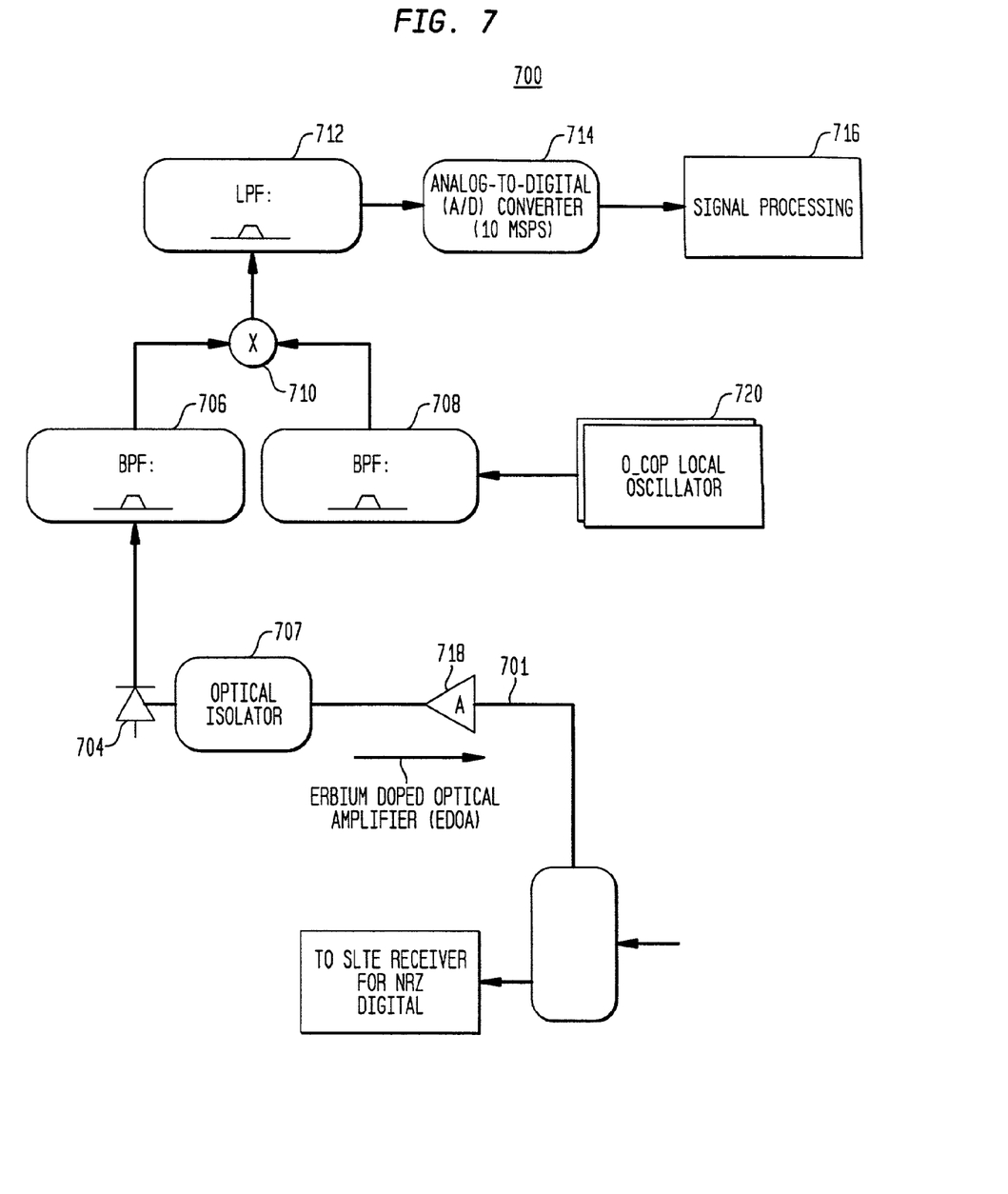
FIG. 7 illustrates another exemplary receiver according to the principles of the invention.

FIG. 7 shows another exemplary receiver 700. In this receiver 700, the OCOP signal is not split. Instead, a highly stable local RF oscillator 720 is used to demodulate the OCOP signal. The local oscillator has the same specifications as in the transmitter oscillator.

The operation of the amplifier 718, optical isolator 707, O/E converter 704, bandpass filters 706 and 708, multiplier 710, low pass filter 712, A/D converter 714 and signal processor are explained with reference to the receiver 600 of FIG. 6.

Figure 8:
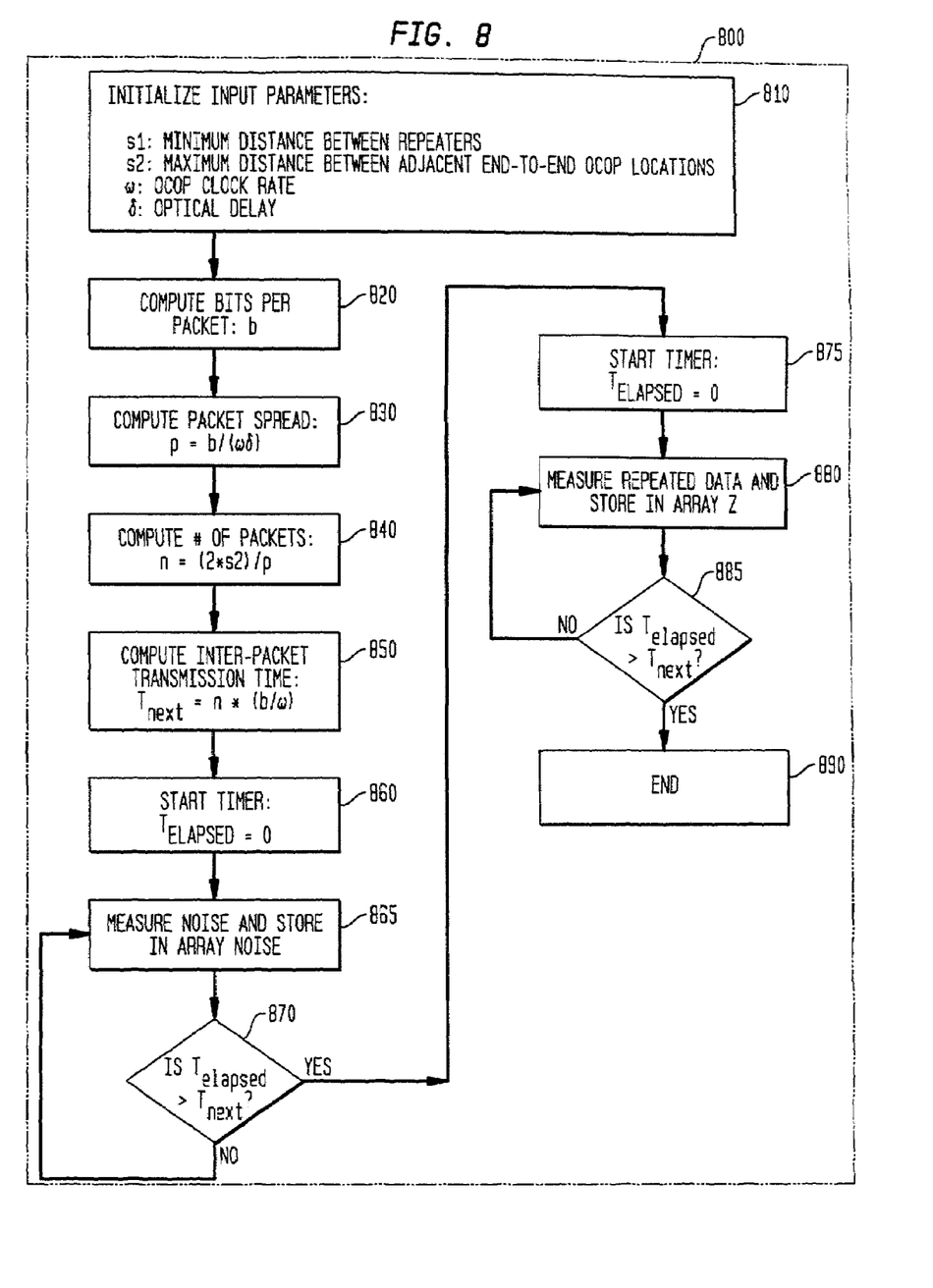
FIG. 8 is a flowchart showing operating parameter processing according to the principles of the invention.

FIG. 8 shows a flowchart 800 illustrating exemplary processing for noise measurement and repeater data measurement according to the principles of the invention. In the first step 810, the following input parameter values are initialized: s1, the minimum distance between repeaters (specified as Km); s2, the maximum distance between adjacent end-to-end OCOP locations (specified as Km); ω, the OCOP clock rate (specified as Mbit/sec), and δ, the optical delay (specified as sec/Km). In a preferred embodiment, a user can be prompted to supply the values of these parameters. In step 820 the number of bits in a packet is computed. In step 830, the packet spread p, expressed in Km units, is computed according to the equation $p=b/(\omega\delta)$. In step 840, the number of packets n is computed according to the equation $n=(2*s2)/p$. In step 850, $T_{next}$, the time between packet transmissions, is computed according to the equation $T_{next}=n*(b/\omega)$.

In the next step 860, a timer is started. The purpose of this timer is to control the amount of time for which measurements are taken. When the timer is started, the elapsed time, denoted $T_{elapsed}$, is set to 0. In step 865, a noise measurement is performed and the measured value is inserted into an array NOISE. In step 870, $T_{elapsed}$ is compared to $T_{next}$: if it is less, control goes back to step 865 for further noise measurement; otherwise, control proceeds to step 875. In step 875, the timer is reinitialized to $T_{elapsed}=0$. In step 880, a repeater data measurement is performed and the measured value is inserted into an array Z. In step 885, $T_{elapsed}$ is compared to $T_{next}$; if it is less, control goes back to step 880, otherwise, flowchart 800 terminates, as at 890, signaling the end of the first and second stages of the three-stage method.

Figure 9:
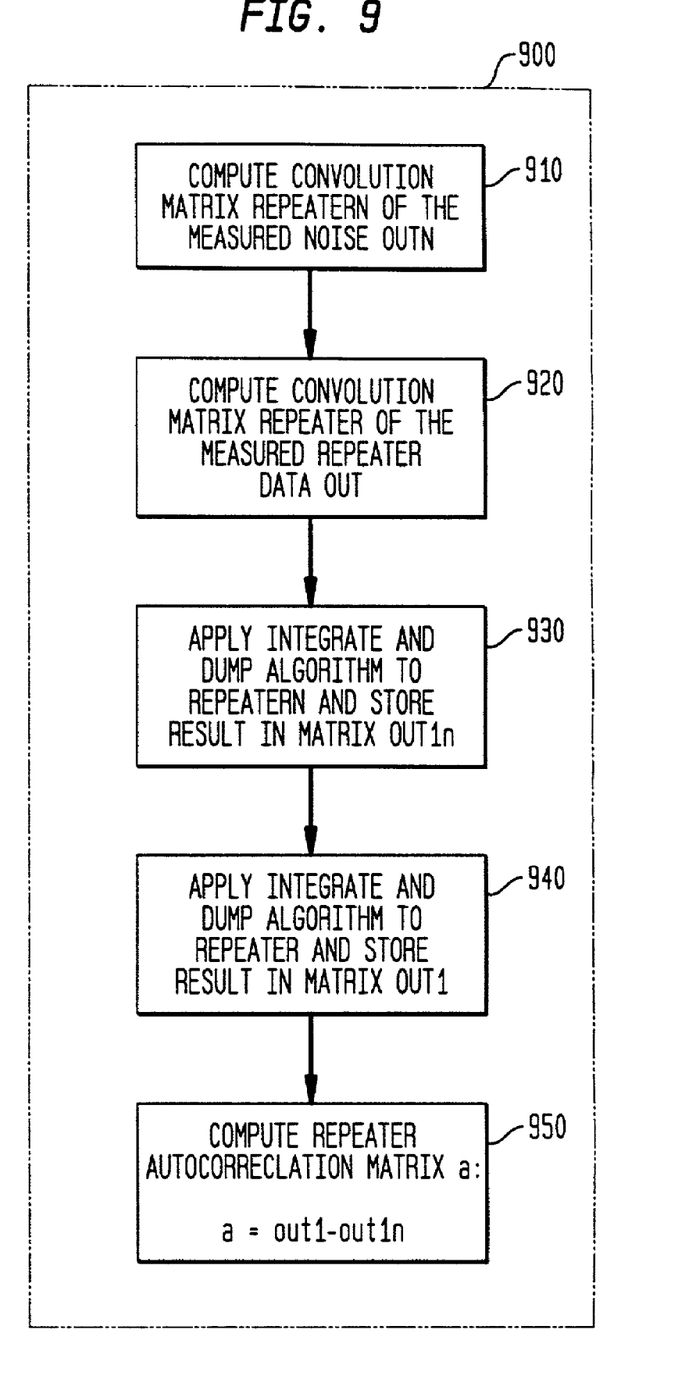
FIG. 9 is another flowchart showing operating parameter processing according to the principles of the invention.

FIG. 9 shows a flowchart 900 illustrating exemplary signal processing of the measured data. In the first step 910, the convolution matrix of the measured noise outn is computed and stored in matrix repeatern. In step 920, the convolution matrix of the measured repeater data out is computed and stored in matrix repeater. In step 930, the Integrate and Dump algorithm is applied to repeatern and stored in matrix out 1n. In step 940, the Integrate and Dump algorithm is applied to repeater and stored in matrix out1. Note that in alternative embodiments of the method, the Integrate algorithm can be applied in lieu of Integrate and Dump. In the final step 950, repeater autocorrelation matrix a is computed according to the equation $a=out1-outn$. Appendix A includes exemplary data runs, output graphs, and MATLAB codes for processing according to the principles of the invention.

It should be understood that the foregoing description of exemplary systems and methods according to the principles of the invention are illustrative only, and are not intended to limit the scope of the invention.

What is claimed is:

1. A method for acquiring operating parameters in a communications system operable to transmit a data signal, the method comprising the steps of:
   generating at least one operating parameter carrier having a frequency value in a vicinity of a null, associated with a data rate bit period, of a data spectrum of the data signal;
   modulating the at least one operating parameter carrier;
   summing the operation parameter carrier with the data signal;
   transmitting the summed signal; and
   recovering the at least one operating parameter carrier from the summed signal.

2. The method of claim 1 wherein the generating step generates at least another operating parameter carrier having another frequency value in the vicinity of the null of the data spectrum.

3. The method of claim 1 wherein the communications system comprises at least one optical channel.

4. The method of claim 1 wherein the at least one operating parameter carrier is a sinusoid.

5. The method of claim 1 wherein the data spectrum of the data signal comprises a plurality of nulls, the method comprising the further steps of:
   generating at least another operating parameter carrier having a frequency value in another of the plurality of nulls; and
   summing the another operating parameter carrier with the data signal,
   wherein the recovering step recovers the another operating parameter carrier.

6. The method of claim 5 wherein the communications system comprises a wavelength division multiplexed communications system.

7. The method of claim 6 wherein the data spectrum is an RZ spectrum.

8. The method of claim 6 wherein the data spectrum is an NRZ spectrum.

9. The method of claim 8 wherein the demodulating step includes the further steps of:
   transmitting RZ format data; and
   recovering NRZ format data from the RZ format data.

10. The method of claim 1 further comprising the step of bandwidth limiting the at least one operating parameter carrier.

11. The method of claim 1 wherein the demodulating step further includes the step of bandwidth filtering the summed signal.

12. A method for optical channel operating parameter acquisition in a communications system operable to transmit an NRZ data signal, comprising the steps of:
   determining a spectrum for the NRZ data;
   generating a first sinusoidal operating parameter carrier having a frequency at a first null, associated with a data rate bit period, in the spectrum and a second sinusoidal operating parameter carrier having a frequency at a second null, associated with the data rate bit period, in the spectrum, the second null being successive to the first null in the spectrum;
   modulating the operating parameter carriers using NRZ operating parameter data, including;
   representing the NRZ operating parameter data in an RZ format;
   modulating the first carrier with the RZ formatted data; and
   modulating the second carrier with the RZ formatted data;
   summing the first operating parameter carrier, the second operating parameter carrier and the NRZ data signal;
   transmitting the summed signal; and
   at a receiver, recovering the operating parameter carriers from the summed signal by processing the RZ formatted data to provide NRZ operating parameter data.

* * * * *